(12) United States Patent
Cullen

(10) Patent No.: US 10,518,920 B2
(45) Date of Patent: Dec. 31, 2019

(54) SYSTEM AND METHOD FOR TOWING A MOBILE BAGGING MACHINE

(71) Applicant: SRC Innovations LLC, Chinook, WA (US)

(72) Inventor: Steven R. Cullen, Chinook, WA (US)

(73) Assignee: SRC Innovations LLC, Chinook, WA (US)

( * ) Notice: Subject to any disclaimer, the term of this patent is extended or adjusted under 35 U.S.C. 154(b) by 103 days.

(21) Appl. No.: 15/145,465

(22) Filed: May 3, 2016

(65) Prior Publication Data

US 2016/0325869 A1    Nov. 10, 2016

Related U.S. Application Data

(60) Provisional application No. 62/156,720, filed on May 4, 2015.

(51) Int. Cl.
| | |
|---|---|
| *B65B 65/00* | (2006.01) |
| *B60K 17/36* | (2006.01) |
| *B62D 49/06* | (2006.01) |
| *B60T 7/20* | (2006.01) |
| *A01F 25/14* | (2006.01) |

(52) U.S. Cl.
CPC .............. *B65B 65/00* (2013.01); *B60K 17/36* (2013.01); *B60T 7/20* (2013.01); *B62D 49/0621* (2013.01); *A01F 2025/145* (2013.01)

(58) Field of Classification Search
CPC .... B60D 1/481; A01F 25/14; A01F 2015/145; A01F 2015/2045; B62D 49/0621; B62D 11/04; B60K 17/34; B60K 17/36

USPC ........... 180/8.1, 24.11, 24.12, 241, 247, 9.21
See application file for complete search history.

(56) References Cited

U.S. PATENT DOCUMENTS

| | | | | |
|---|---|---|---|---|
| 450,652 | A * | 4/1891 | Westinghouse | B61D 43/00 105/112 |
| 650,437 | A * | 5/1900 | Valentine | B62D 49/0621 180/237 |
| 877,293 | A * | 1/1908 | Catel | F16H 19/08 74/72 |
| 938,786 | A * | 11/1909 | Palmer | B62D 7/144 180/234 |
| 939,077 | A * | 11/1909 | Palmer | B62D 7/144 180/24 |
| 1,139,622 | A * | 5/1915 | Yordi | B62M 23/00 180/224 |
| 1,198,098 | A * | 9/1916 | Berg | B60K 17/36 180/24.11 |
| 1,267,028 | A * | 5/1918 | Whittemore | B60K 17/34 180/246 |
| 1,571,748 | A * | 2/1926 | Wilson | B60K 17/36 180/24 |

(Continued)

*Primary Examiner* — Robert F Long
*Assistant Examiner* — Eduardo R Ferrero
(74) *Attorney, Agent, or Firm* — Brinks Gilson & Lione; Ryan L. Marshall; Jonathan Hartley

(57) ABSTRACT

Systems and methods for towing a bagging machine are disclosed. The system includes a coupler connected to a hopper that is configured to raise and lower relative to a chassis of the bagging machine. The chassis has at least six wheels in contact with the ground that remain in contact with the ground when the coupler is attached to a towing vehicle hitch. The hopper raises to attach the coupler to the hitch and lowers to engage the hitch for towing, while keeping the wheels on the ground.

13 Claims, 9 Drawing Sheets

(56) References Cited

U.S. PATENT DOCUMENTS

| | | | | |
|---|---|---|---|---|
| 2,232,015 A * | 2/1941 | Skok | B62D 7/00 | 180/410 |
| 2,646,291 A * | 7/1953 | Chambers | B62D 13/04 | 280/103 |
| 2,746,586 A * | 5/1956 | Van Doorne | B60K 17/36 | 192/99 S |
| 2,805,750 A * | 9/1957 | MacDonald | B65G 65/00 | 198/304 |
| 2,871,965 A * | 2/1959 | Ainsworth | B60K 17/306 | 180/254 |
| 2,882,984 A * | 4/1959 | Davey | B60B 15/26 | 180/245 |
| 3,096,995 A * | 7/1963 | Richnow, Jr. | B60G 5/047 | 180/22 |
| 3,193,039 A * | 7/1965 | Sutton | B62K 5/027 | 180/210 |
| 3,275,091 A * | 9/1966 | Steck | B62D 49/0621 | 180/24.02 |
| 3,290,056 A * | 12/1966 | Smith | B60G 17/052 | 105/198.1 |
| 3,343,621 A * | 9/1967 | Van Doorne | B60G 5/04 | 180/342 |
| 3,347,332 A * | 10/1967 | Thompson | B60K 17/36 | 180/24.12 |
| 3,433,002 A * | 3/1969 | Custance | A01D 34/47 | 180/19.3 |
| 3,439,765 A * | 4/1969 | Keegan | B60K 17/36 | 180/24.12 |
| 3,446,302 A * | 5/1969 | Schoonover | B60G 5/06 | 180/14.4 |
| 3,542,393 A * | 11/1970 | Verdi | B60G 5/06 | 180/22 |
| 3,603,423 A * | 9/1971 | Schoonover | B60G 5/04 | 180/22 |
| 3,687,061 A | 8/1972 | Eggenmuller et al. | | |
| 3,693,743 A * | 9/1972 | Tanguay | B60G 5/02 | 180/24.05 |
| 3,718,346 A * | 2/1973 | Self | B60G 17/033 | 180/14.1 |
| 3,724,581 A * | 4/1973 | Terrell | B60K 17/36 | 180/24.12 |
| 3,724,635 A * | 4/1973 | Byrd | A01F 25/2027 | 198/304 |
| 3,788,420 A * | 1/1974 | Lacroix | B60K 17/36 | 180/24.11 |
| 3,854,545 A * | 12/1974 | Barcroft | B60K 17/36 | 180/24.12 |
| 3,881,565 A * | 5/1975 | Parrish | B60K 25/08 | 180/24.12 |
| 3,910,132 A * | 10/1975 | Elonen | B60K 17/32 | 180/24.08 |
| 3,923,112 A * | 12/1975 | Goodgame | B60G 5/06 | 180/24.11 |
| 3,936,072 A * | 2/1976 | Mandel | B62D 61/125 | 280/686 |
| 3,976,186 A * | 8/1976 | Neier | A01D 87/02 | 198/314 |
| 4,016,946 A * | 4/1977 | Demichelis | B60K 17/36 | 180/242 |
| 4,046,068 A | 9/1977 | Eggenmüller et al. | | |
| 4,787,646 A * | 11/1988 | Kamlukin | A01D 34/64 | 280/124.113 |
| 4,962,821 A * | 10/1990 | Kim | B60K 17/14 | 180/242 |
| 5,295,554 A * | 3/1994 | Cullen | A01F 25/14 | 180/236 |
| 5,297,377 A * | 3/1994 | Cullen | A01F 25/14 | 100/100 |
| 5,313,768 A * | 5/1994 | Cullen | A01F 25/14 | 53/259 |
| 5,339,611 A * | 8/1994 | Roderfeld | B60G 5/00 | 180/209 |
| 5,355,659 A * | 10/1994 | Cullen | A01F 25/14 | 100/100 |
| 5,396,753 A * | 3/1995 | Cullen | A01F 25/14 | 100/100 |
| 5,452,861 A * | 9/1995 | Faccia | A01F 25/2027 | 241/101.72 |
| 5,480,098 A * | 1/1996 | Doppstadt | B60G 5/047 | 180/209 |
| 5,894,713 A * | 4/1999 | Cullen | A01F 25/14 | 53/436 |
| 5,906,384 A * | 5/1999 | Nelson | B60D 1/00 | 280/33.998 |
| 5,960,612 A * | 10/1999 | Cullen | A01F 25/14 | 53/436 |
| 6,202,389 B1 * | 3/2001 | Inman | A01F 25/14 | 141/313 |
| 6,430,897 B1 * | 8/2002 | Cameron | A01F 25/14 | 53/436 |
| 6,755,011 B1 * | 6/2004 | Inman | A01F 25/14 | 53/167 |
| 6,874,807 B1 * | 4/2005 | Labadie | B60D 1/00 | 105/364 |
| 6,955,030 B2 * | 10/2005 | Cullen | A01F 25/14 | 53/469 |
| 7,004,489 B2 * | 2/2006 | Brown | B60D 1/00 | 280/491.3 |
| 7,237,576 B1 * | 7/2007 | Cullen | A01F 25/183 | 141/114 |
| 7,398,634 B2 * | 7/2008 | Sanguinetti | A01F 15/044 | 100/100 |
| 7,594,374 B2 * | 9/2009 | Cullen | A01F 25/14 | 141/74 |
| D609,723 S * | 2/2010 | Schmidt | D15/23 | |
| 7,832,509 B2 * | 11/2010 | Thomson | B60K 17/36 | 180/24.11 |
| 7,934,360 B2 * | 5/2011 | Cullen | A01F 25/14 | 141/114 |
| 9,315,141 B1 * | 4/2016 | Piercey, III | B60P 3/40 | |
| 2007/0084153 A1 * | 4/2007 | Cullen | A01F 25/14 | 53/527 |
| 2011/0094807 A1 * | 4/2011 | Pruitt | B60K 1/04 | 180/65.6 |
| 2011/0167767 A1 * | 7/2011 | Cullen | A01D 87/02 | 53/439 |
| 2011/0180335 A1 * | 7/2011 | Ivankov | B60K 17/043 | 180/14.4 |
| 2015/0321526 A1 * | 11/2015 | Scarth | B60D 1/481 | 280/457 |

* cited by examiner

SYSTEM AND METHOD FOR TOWING A MOBILE BAGGING MACHINE

RELATED APPLICATIONS

The present patent document claims the benefit of the filing date under 35 U.S.C. § 119(e) of Provisional U.S. Patent Application Ser. No. 62/156,720 filed May 4, 2015, which is hereby incorporated by reference.

BACKGROUND

1. Technical Field

The present disclosure relates to machines for bagging materials such as organic materials, silage, compost, grain, sawdust, dirt, sand, and other compactable materials, and more particularly to an apparatus and methods for towing a bagging machine.

2. Background Information

Agricultural feed bagging machines have been employed for several years to pack or bag silage and the like into elongated bags. Early bagging machines were towed from job site to job site using ordinary farm equipment, such as a tractor or pickup truck. The earliest bagging machine designs had two different configurations so that they could be towed on the highway with their wheels in a first configuration, and then at the job site the wheels would be turned perpendicular for bagging operations. To tow the bagging machine, one end of the bagging machine with a coupler would be lifted and placed onto the hitch of the tow vehicle, so that the hitch would support one end, and an axle would support the other end.

As bagging machines have grown in size, larger tow vehicles have been required to tow the bagging machine. FIG. 1 illustrates a more modern bagging machine 100 being pulled by a large tractor truck 102. Like earlier bagging machines, this bagging machine 100 is supported at one end by a hitch 104 and by an axle 106 at the other end while being towed. As can be seen in FIG. 1, a second axle 108, is just off the ground while the bagging machine 100 is being towed. The second axle 108 supports the other end of the bagging machine 100 when the hitch 104 is uncoupled.

When towing, the hitch 104 must be strong enough to pull the mobile bagging machine 100 along the roadway, and it must also support the weight of the mobile bagging machine 100 on the hitch, or hitch weight. The hitch weight helps to keep the mobile bagging machine 100 coupled to the tow vehicle 102. With too little hitch weight, the mobile bagging machine 100 may not tow properly. Additionally, since the hitch 104 is supporting at least some of the weight of the mobile bagging machine 100, the weight supported by axle 108 may be reduced. However, too much hitch weight may overload the tow vehicle 102 and/or lead to an unstable towing configuration. Highways typically have a maximum axle weight for vehicles driving on them. For this reason, as a vehicles weight increases, it is common to use more axles to reduce the weight on any single axle. For example, the tractor truck 102 of FIG. 1 has two rear axles.

The bagging machine 100 of FIG. 1 is limited in its overall size by the weight on the first axle 106. Once it reaches the maximum capacity of a roadway, any additional weight must be supported somewhere other than the first axle 106, or it will not be allowed on the roadway. By adjusting the position of the first axle 106, the weight distribution between the first axle 106 and the hitch 104 may be changed to cause the hitch 104 to carry a greater load. Alternatively, the bagging machine 100 could have another load carrying axle for use on the highway. For instance, first axle 106 could have a companion axle for distributing the weight, or the second axle 108 could be used to carry some of the weight.

However, in order to use a second, load bearing axle on the frame requires that the axles articulate so that they remain on the ground. If the axle were not articulated, the wheel closest to the tow vehicle would simple lift off of the ground when the hitch was connected. Unfortunately, enabling the axle to articulate results in a more complex design, and may also interfere with other aspects of bagging.

It would be beneficial to develop a system and method for towing a bagging machine that would enable a larger bagging machine to be towed, without the added complexity and complications of an articulated axle.

BRIEF SUMMARY

In one aspect of the disclosure, a mobile bagging machine includes a chassis, at least three axles, a bagging tunnel, a hopper, a packing assembly, and an actuator. The axles are mounted to the chassis and the bagging tunnel is mounted at a rear end of the chassis. The hopper is pivotably mounted to the chassis at a rear end of the hopper and is configured to pivot about a horizontal axis. The hopper has a coupler at a front end of the hopper. The packing assembly is disposed between the hopper and the bagging tunnel. The actuator configured to cause the hopper to selectively pivot to change the height of the coupler relative to the chassis.

In some embodiments, the actuator is a linear actuator having a first end coupled to the chassis and a second end coupled to the hopper. In some embodiments, the actuator is further configured to selectively float.

In some embodiments, one of the axles is a steering axle. In some embodiments, the steering axle is configured to articulate relative to the mobile bagging machine. In some embodiments, the steering axle has a selective floating configuration.

In some embodiments, wherein the hopper has a resting configuration for bagging operations.

In some embodiments, two of the axles are tandem axles, and adjacent wheels on the tandem axles are driven by a common drive wheel. In some embodiments, the common drive wheel is configured to selectively engage and disengage the adjacent wheels. In some embodiments, the selective engagement is provided by raising or lowering the common drive wheel.

In another aspect, a method of towing a mobile bagging machine is disclosed. The method includes providing a coupler mounted to a hopper configured to have a front end raise and lower, raising the front end of the hopper to lift the coupler, with all wheels of the chassis maintaining contact with a support surface, positioning a hitch of a tow vehicle below the coupler, lowering the coupler onto the hitch to transfer a portion of the weight of the hopper onto the hitch, and securing the coupler to the hitch.

In some embodiments, the hopper is pivotly mounted to the chassis at a rear end of the hopper and raising the front end of the hopper pivots the hopper relative to the chassis.

In some embodiments, the chassis has three axles that maintain contact with the support surface.

In some embodiments, raising the front end of the hopper comprises extending a linear actuator coupled to the hopper and the chassis, and lowering the coupler comprises retracting the linear actuator. In some embodiments, the method further includes putting the linear actuator in a float mode and lowering the coupler onto the hitch.

In another aspect, a hopper for a mobile bagging machine is disclosed. The hopper includes a front end having a coupler configured to couple to a hitch of a tow vehicle, a rear end having a pivoting connection for connection to a chassis of a mobile bagging machine, and a connection point between the front end and the rear end, the connection point for receiving a linear actuator that causes the hopper to pivot at the rear end.

DETAILED DESCRIPTION

The described embodiments of the present disclosure will be best understood by reference to the drawings, wherein like reference numbers indicate identical or functionally similar elements. It will be readily understood that the components of the present disclosure, as generally described and illustrated in the figures herein, could be arranged and designed in a wide variety of different configurations. Thus, the following more detailed description, as represented in the figures, is not intended to limit the scope of the invention as claimed, but is representative of some embodiments disclosed herein.

Figure 2:
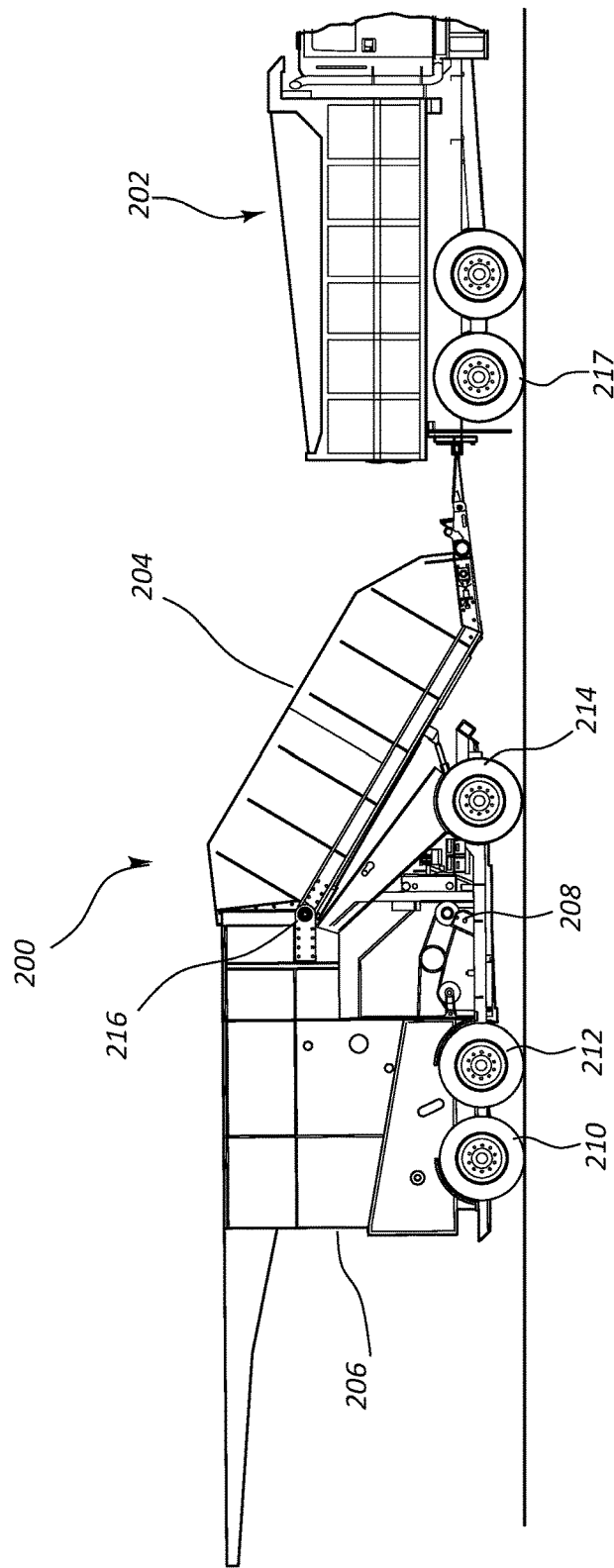
FIG. 2 illustrates an embodiment of a mobile bagging machine coupled to a tow vehicle.

FIG. 2 illustrates an embodiment of a mobile bagging machine 200 having an improved system for towing and a truck 202 towing the mobile bagging machine 200. The mobile bagging machine 200 has a front end that faces the truck while it is being towed, and a rear end opposite the front end. The mobile bagging machine 200 has a hopper 204 at the front end for receiving material to be bagged, a tunnel 206 for directing the packed material into a bag at the rear end of the bagging machine 200, a packing assembly (not visible) between the hopper 204 and the tunnel 206 for packing material into a bag, and a chassis 208 providing a base for the different components.

The packing assembly has a rotor with tines that rotate through a comb. The tines pick up material from the hopper 204 and pack the material into the tunnel 206. Any material that sticks to the tines is then brushed off as the tines pass through the comb back into the hopper 204. The tunnel 206 provides a structure to mount the bag to and may be adjustable in size. Other types of packing assemblies and tunnels are possible, and these are only given as an example. Embodiments of the disclosure are compatible with various types of packing assemblies and tunnels, and these elements will not be described in further detail.

The chassis 208 has three axles supporting the weight of the bagging machine 200. A first axle 210 and a second axle 212 are located near the packing assembly, and a third axle 214 is positioned near the front of the bagging machine 200. Because the chassis 208 has three axles, together they can support three times as much weight as a similar bagging machine supported by a single axle. Or, an axle having a lower weight capacity relative to a single axle design may be used.

Figure 3:
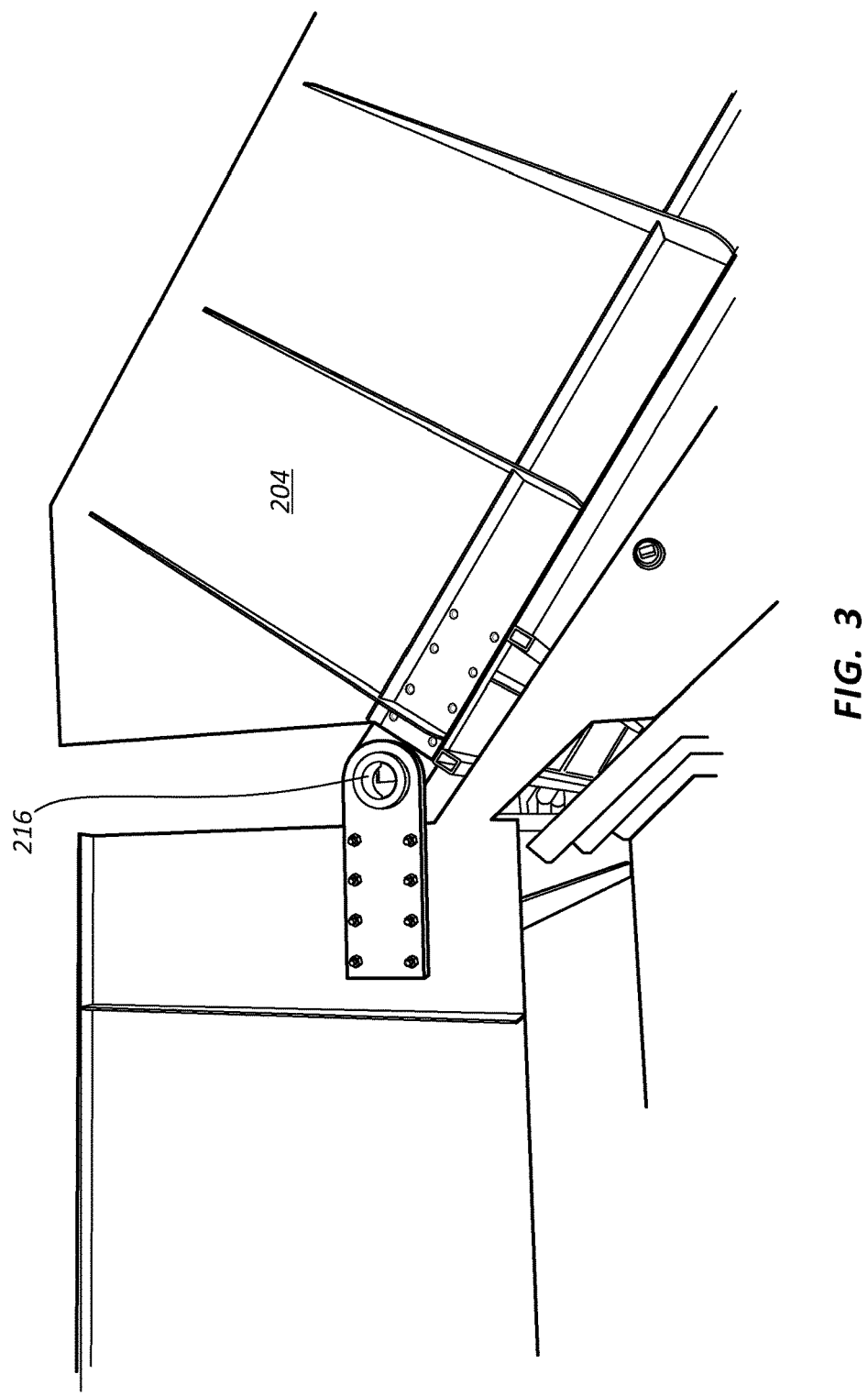
FIG. 3 illustrates a detailed view of a pivoting connection of a hopper.

The hopper 204 has a conveying mechanism, such as a conveyer belt, located within the hopper 204 that moves material from the front of the hopper rearward toward the packing assembly. The hopper 204 has a pivot point 216, shown in more detail in FIG. 3, mounted near the rear end of the hopper 204. The hopper 204 rotates about the pivot point 216 with a horizontal axis parallel to the axles of the bagging machine 200. A linear actuator 218 (see FIG. 5), coupled between the chassis 208 and the hopper 204 causes the hopper 204 to selectively pivot.

Figure 1:
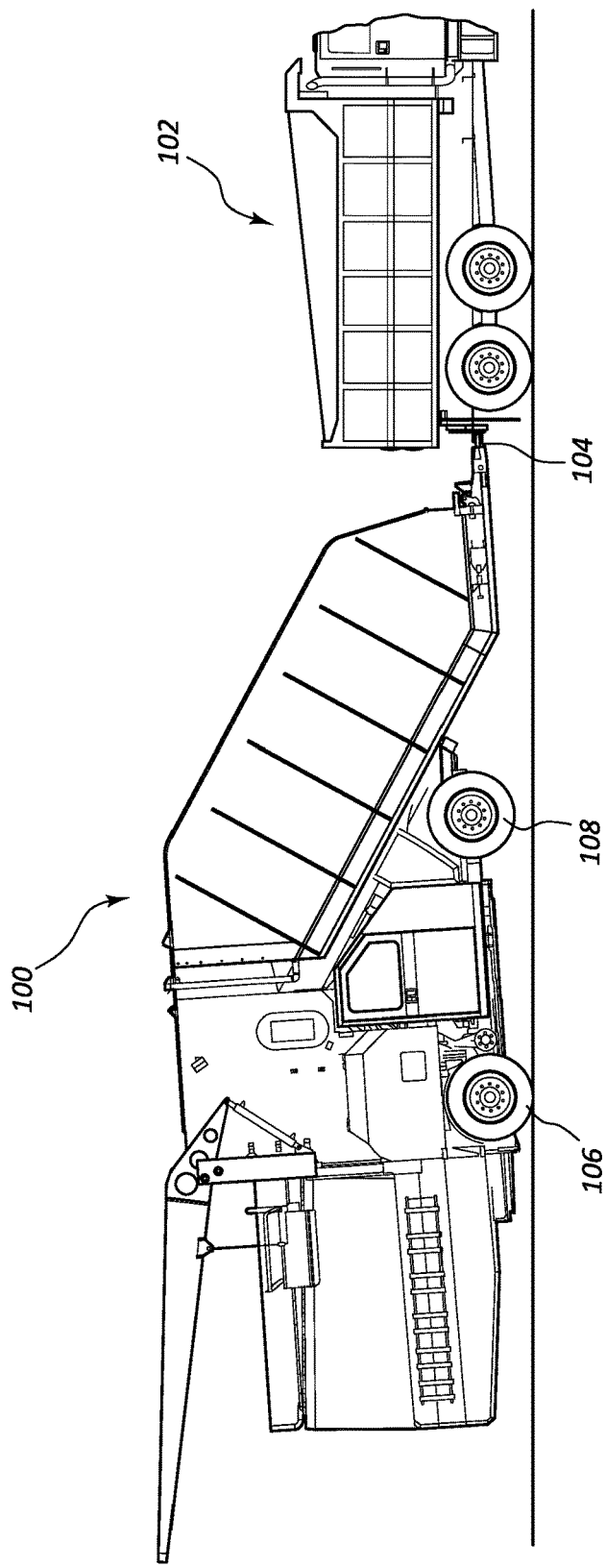
FIG. 1 illustrates a prior art mobile bagging machine being towed.

As can be seen in FIG. 2, while being towed, all three axles of the bagging machine 200 maintain contact with a support surface, such as a highway. Additionally, because the tow vehicle 202 no longer has to support a substantial portion of the weight of the bagging machine 200 on its hitch, it may be smaller in size than the tow vehicle 102 of FIG. 1. The tow vehicle 102 of FIG. 2 has a single rear axle 217 as compared to the tow vehicle 102 of FIG. 1.

Figure 4:
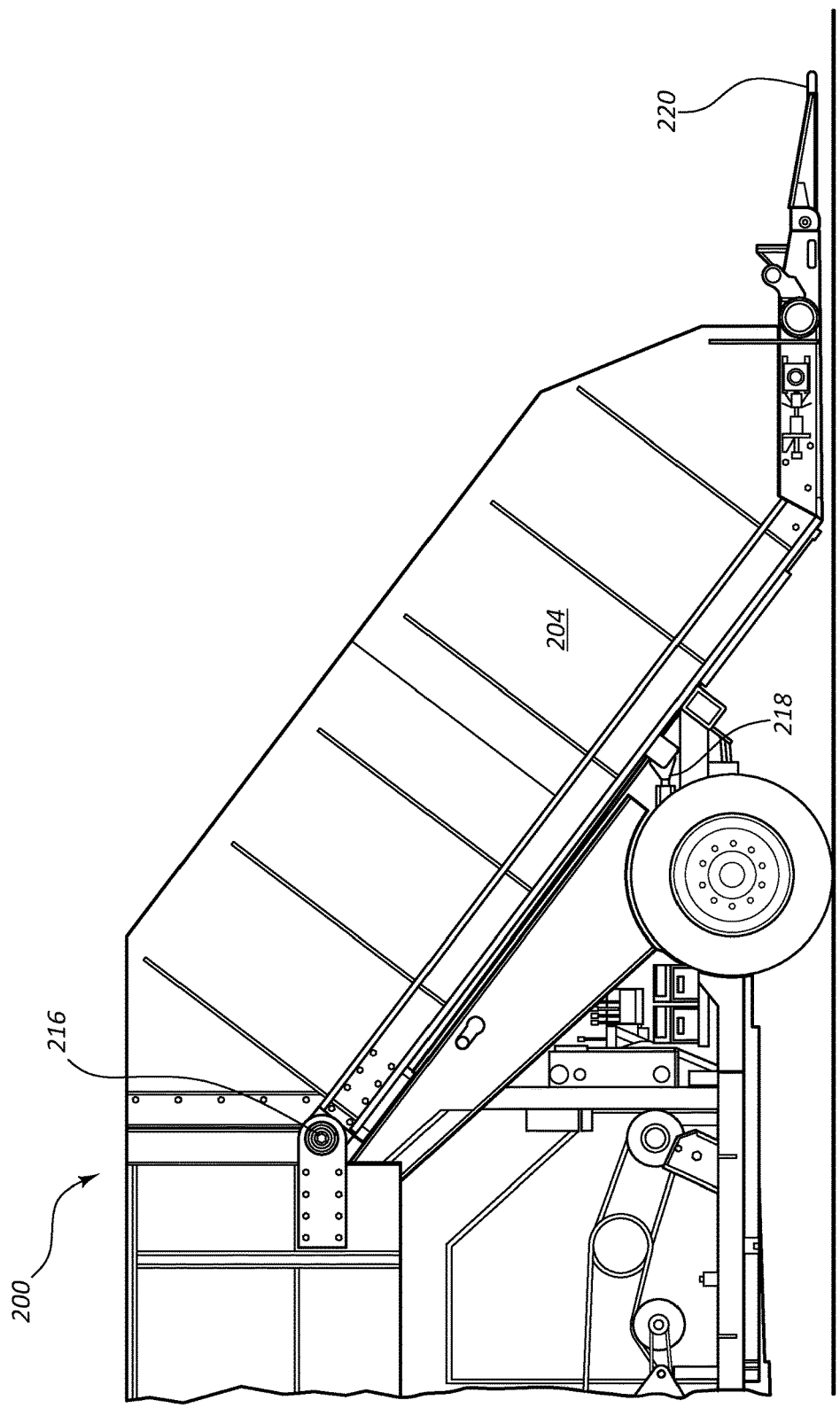
FIG. 4 illustrates a view of an embodiment of a hopper in a lowered position.
Figure 5:
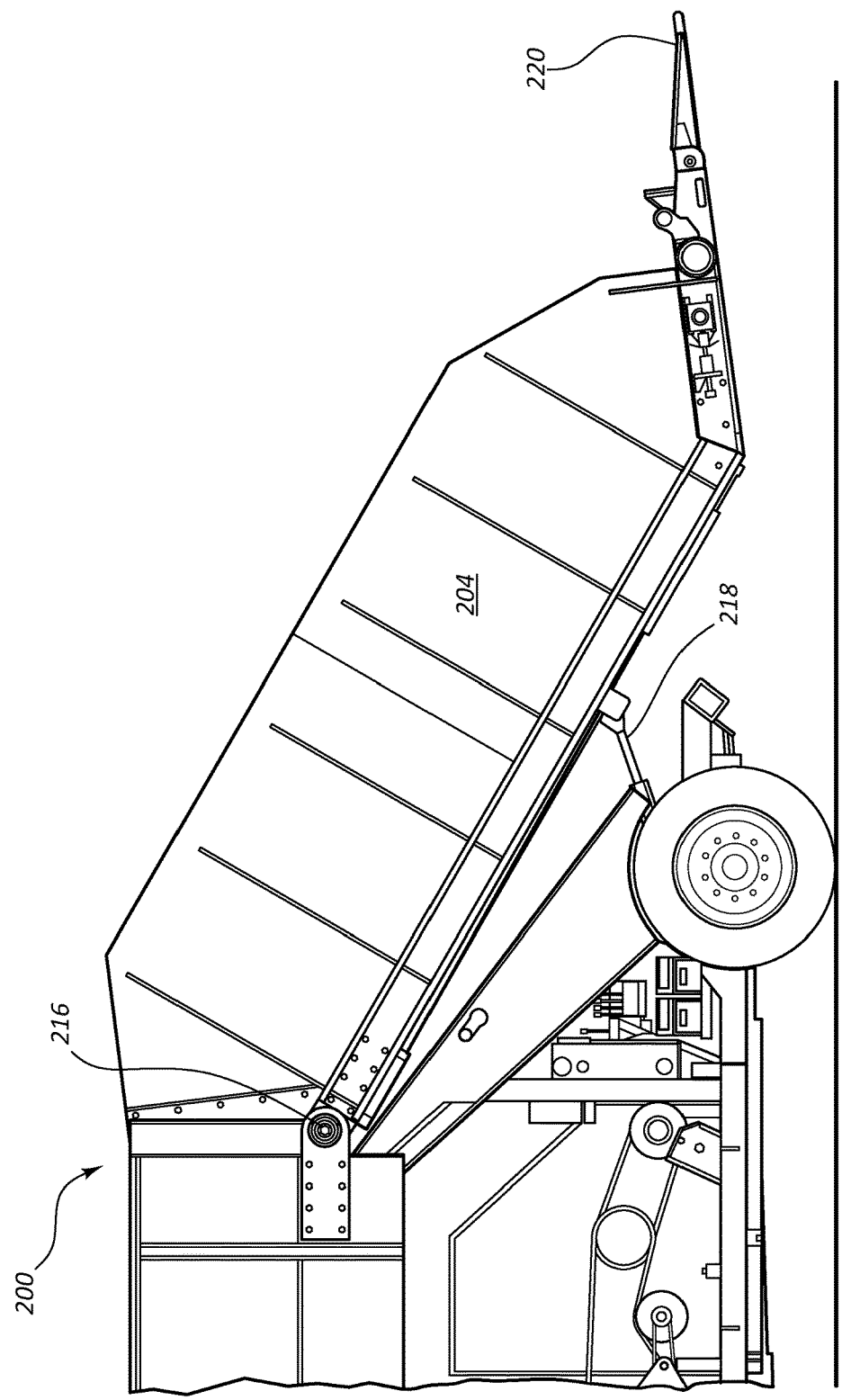
FIG. 5 illustrates a view of the embodiment of a hopper in a raised position.

FIG. 4 illustrates a coupler 220 of the mobile bagging machine 200. The coupler 220 is attached to the front end of the hopper 204, which rotates about the pivot point 216. The front end of the hopper 204 may rotate from a position near the ground, as shown in FIG. 4, to an elevated position as shown in FIG. 5. The linear actuator 218, which may be a hydraulic cylinder, rack and pinion, or other mechanism, has one end coupled to the chassis 208, and a second end coupled to the hopper 204. By extending the linear actuator 218, the front end of the hopper 204 rises and by retracting the linear actuator 218, the front end of the hopper 204 lowers.

To tow the mobile bagging machine 200, the front end of the hopper 204 is lifted by the linear actuator 218 as shown in FIG. 5. This raises the coupler 220 above the level of the hitch of the tow vehicle 202. The tow vehicle 202 then positions the hitch to receive the coupler 220. Once the hitch is in position, the linear actuator 218 is retracted and the front end of the hopper 204 lowers the coupler 220 onto the hitch. The weight of the hopper 204 provides the necessary hitch weight for towing the mobile bagging machine 200. Once the coupler 220 is supported by the hitch the linear actuator 218 may be put in a float mode. The float mode allows the linear actuator 218 to extend and retract with movement of the hopper 204.

Using the coupler described above enables the mobile bagging machine 200 to be supported by all three axles while being towed. The rear axles 210, 212 are tandem axles that are rigidly attached to the chassis 208. Having the tandem axles rigidly attached enhances the quality of the bags being filled. The front axle 214 is a steering axle that allows the wheels to turn for steering. The wheels of the steering axle are steered by a linear actuator that is put into float mode for towing operations. With the linear actuator in float mode, the wheels are able to follow the tow vehicle 202 for better maneuverability when towing. The front axle 214 also articulates relative to the chassis of the mobile bagging machine, providing a limited suspension.

Figure 6:
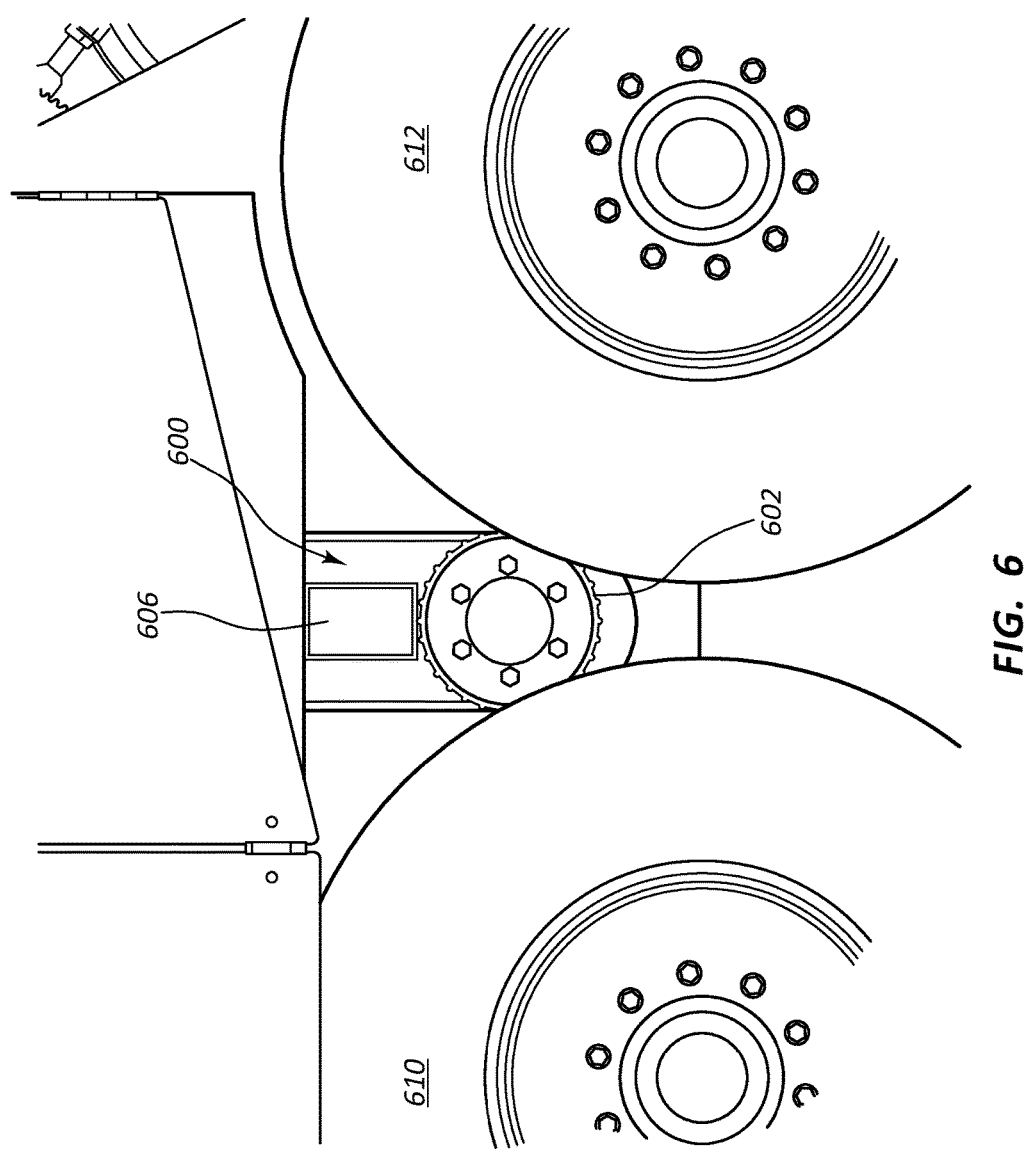
FIG. 6 illustrates a detailed view of a drive mechanism in a drive position.
Figure 7:
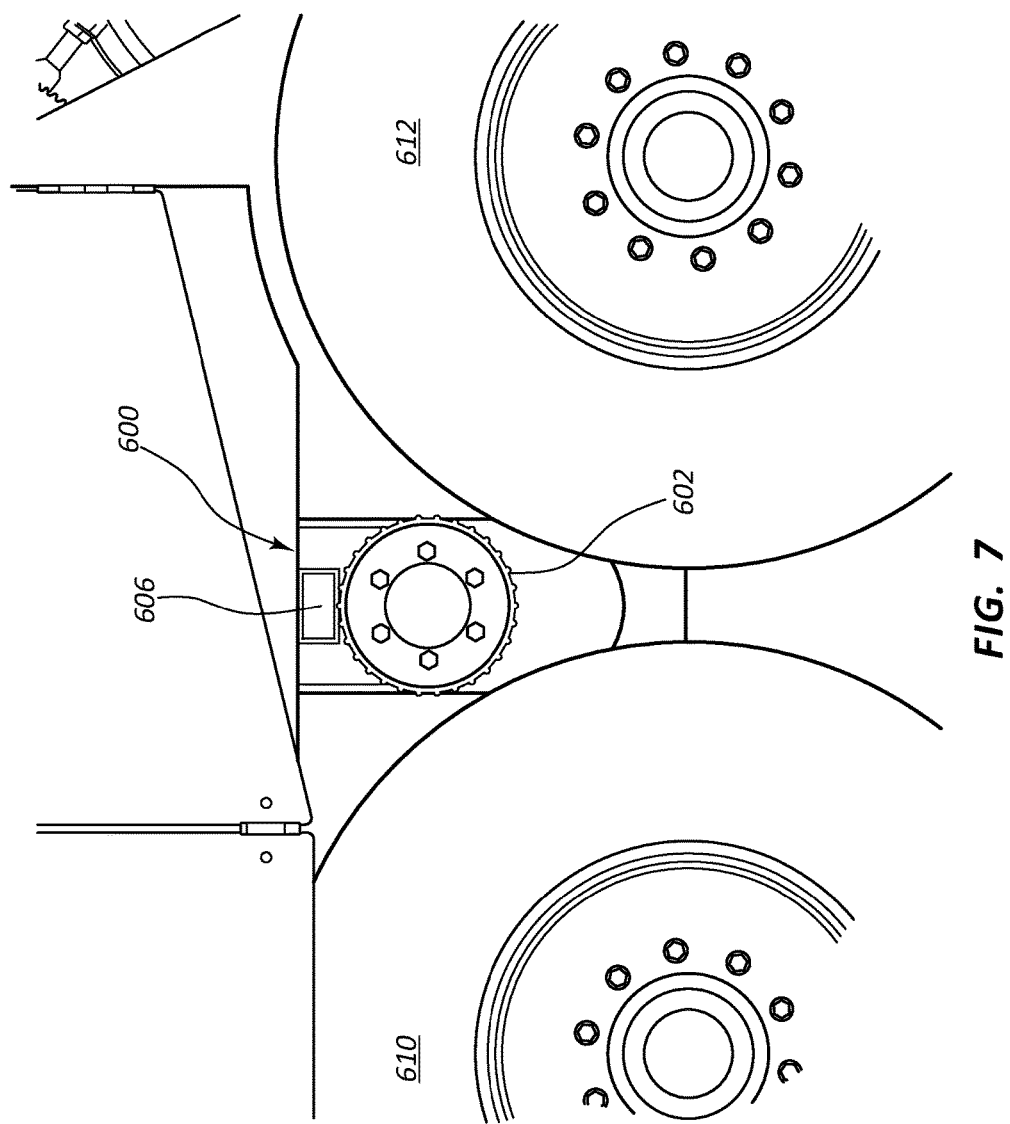
FIG. 7 illustrates a detailed view of the drive mechanism in a freewheeling position.

FIG. 6 illustrates a drive mechanism 600 for the mobile bagging machine 200. The drive mechanism 600 is used to drive the mobile bagging machine 200 when it is not being towed. The drive mechanism 600 has a drive wheel 602 connected to a source of torque, such as a hydraulic motor. The drive wheel 602 contacts adjacent wheels 610, 612 on the tandem axles, and as the drive wheel 602 turns, it drives the adjacent wheels 610, 612. The drive wheel 602 has an actuator 606 for lowering the drive wheel 602 into contact with the adjacent wheels 610, 612 as shown in FIG. 6 and for lifting the drive wheel 602 off of the adjacent wheels 610, 612 as shown in FIG. 7. The actuator 606 presses the drive wheel 602 into contact with the adjacent wheels 610, 612 and allows for contact with the adjacent wheels 610, 612 as they change diameter with wear.

FIG. 7 illustrates the drive mechanism 600 in a disengaged configuration. In this configuration the drive wheel 602 is lifted off of the adjacent wheels 610, 612 of the axle allowing them to freewheel. With the drive mechanism 600 in this configuration, the mobile bagging machine 200 is ready to be towed.

Figure 8:
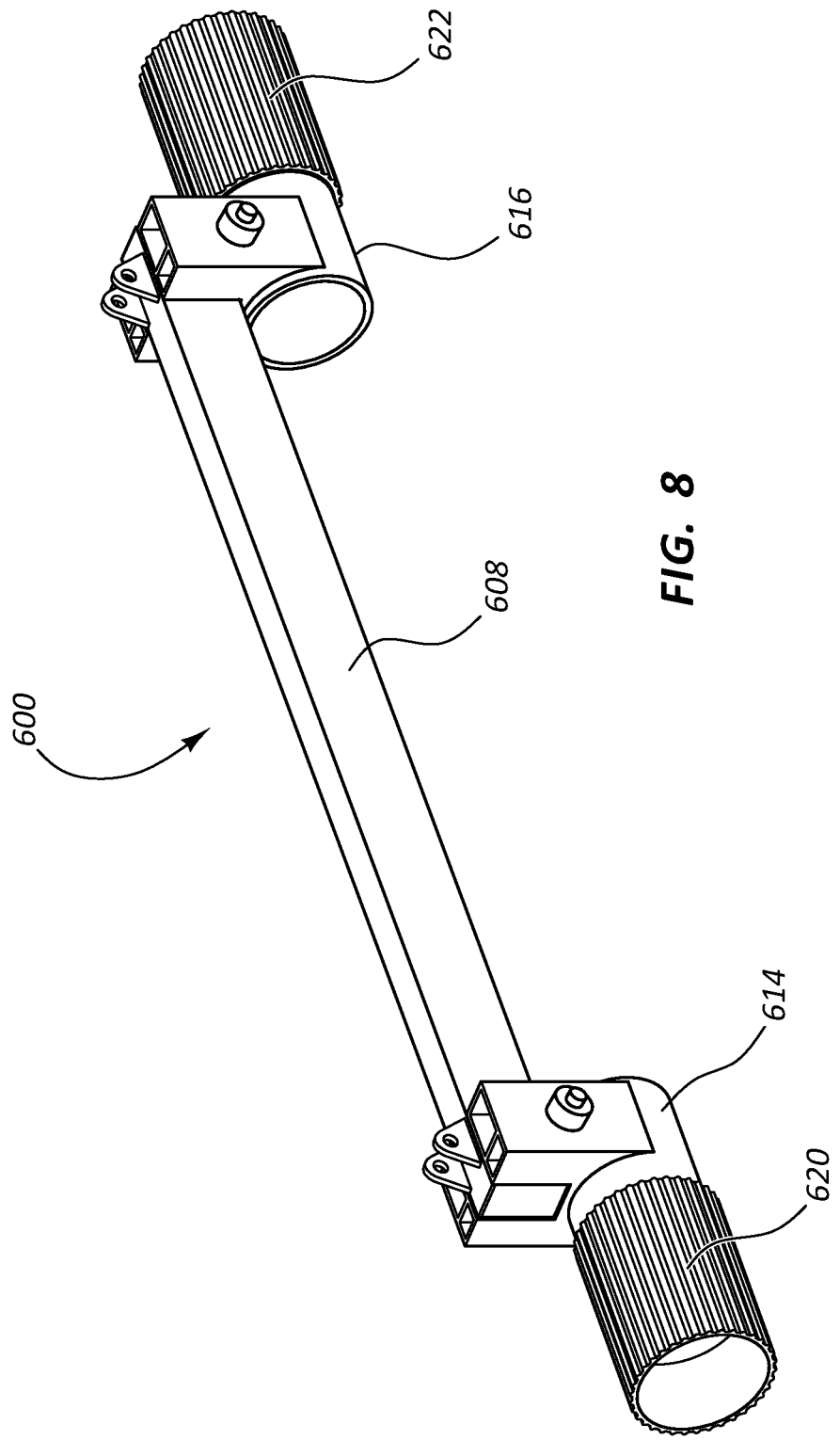
FIG. 8 illustrates a view of the drive mechanism removed from the mobile bagging machine.

FIG. 8 illustrates the drive mechanism 600 removed from the mobile bagging machine 200 and without the actuator 606 for raising and lowering the drive mechanism 600. The drive mechanism 600 has a support beam 608 that spans the width of the bagging machine 200 and supports two drive wheels 620, 622 for contacting the wheels on either side of the mobile bagging machine 200. A first drive 614 and a second drive 616 allow independent sources of torque to be transmitted to the wheels. Because the torque sources are independent, the wheels may have a speed differential between them as opposed to a rigid connection.

Figure 9:
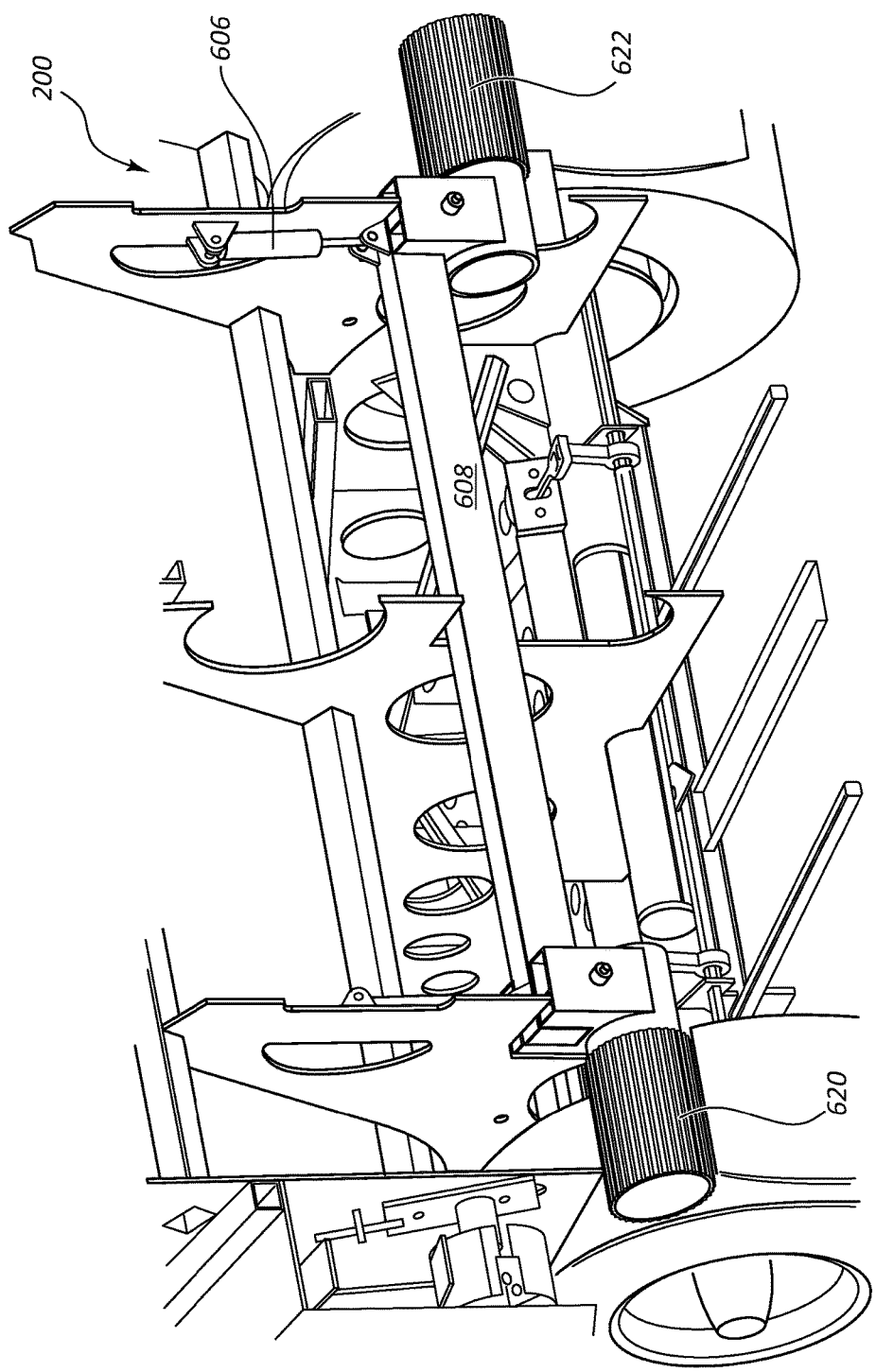
FIG. 9 illustrates a view of the drive mechanism as installed in the mobile bagging machine.

FIG. 9 illustrates the drive mechanism 600 in position in the mobile bagging machine 200 showing the beam 608 spanning the width of the bagging machine 200, the first drive 610, the second drive 612, and two linear actuators 606 for moving the drive assembly 600.

From the foregoing it can be seen that the described embodiments allow for a bagging machine of increased size without requiring an articulated axle. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A mobile bagging machine, comprising: a chassis having a front end and a rear end; at least three axles mounted to the chassis; a bagging tunnel mounted at the rear end of the chassis; a hopper having a front end and a rear end, the hopper pivotably mounted to the chassis at a rear end of the hopper and configured to pivot about a horizontal axis, the hopper having a coupler at a front end of the hopper; a packing assembly disposed between the bagging tunnel and the hopper; and a first linear actuator configured to cause the hopper to selectively pivot to change the height of the coupler relative to the chassis, the first linear actuator further comprising a first end coupled to the chassis and a second end coupled to the hopper, wherein two of the axles are tandem axles, wherein adjacent wheels on the tandem axles are driven by direct contact with a common drive wheel, wherein a support beam spans the bagging machine and supports a first common drive wheel and a second common drive wheel, and wherein the common drive wheels are configured to selectively engage and disengage the adjacent wheels by the actuation of a second linear actuator configured for raising and lowering the support beam.

2. The mobile bagging machine of claim 1, wherein the linear actuator is further configured to extend and retract with movement of the hopper.

3. The mobile bagging machine of claim 1, wherein one of the axles is a steering axle.

4. The mobile bagging machine of claim 3, wherein the steering axle is configured to articulate relative to the mobile bagging machine.

5. The mobile bagging machine of claim 3, wherein the steering axle is attached to a third linear actuator that is configured to extend and retract with steering of the wheels.

6. The mobile bagging machine of claim 1, wherein the hopper has a resting configuration for bagging operations.

7. The mobile bagging machine of claim 1, wherein the first common drive wheel being driven by a first drive and the second common drive wheel being driven by a second drive to allow independent sources of torque.

8. A method of towing a mobile bagging machine, comprising: providing a coupler mounted to a hopper, the hopper configured to have a front end, wherein the hopper is pivotably mounted to a chassis that comprises a plurality of wheels at a rear end of the hopper, and raising or lowering the front end of the hopper pivots the hopper relative to the chassis; raising the front end of the hopper to lift the coupler, with all wheels of the chassis maintaining contact with a support surface, wherein raising the front end of the hopper comprises extending a first linear actuator coupled to the hopper and the chassis, and lowering the coupler comprises retracting the first linear actuator; positioning a hitch of a tow vehicle below the coupler; lowering the coupler onto the hitch to transfer a portion of the weight of the hopper onto the hitch; and securing the coupler to the hitch, wherein the bagging machine comprises: the chassis having a front end and a rear end; at least three axles mounted to the chassis; a bagging tunnel mounted at the rear end of the chassis; a packing assembly disposed between the bagging tunnel and the hopper; and wherein two of the axles are tandem axles, and wherein adjacent wheels on the tandem axles are driven by direct contact with a common drive wheel wherein a support beam spans the bagging machine and supports a first common drive wheel and a second common drive wheel, and wherein the common drive wheels are configured to selectively engage and disengage the adjacent wheels by the actuation of a second linear actuator configured for raising and lowering the support beam.

9. The method of claim 8, wherein the chassis has three axles that maintain contact with the support surface.

10. The method of claim 8, further comprising putting the linear actuator in a float mode and lowering the coupler onto the hitch.

11. The method of claim 8, wherein the linear actuator is further configured to extend and retract with movement of the hopper.

12. The method of claim 8, wherein one of the axles is a steering axle.

13. The method of claim 8, wherein the hopper has a resting configuration for bagging operations.

\* \* \* \* \*